(12) United States Patent
Fraley (10) Patent No.: US 8,960,732 B2
(45) Date of Patent: Feb. 24, 2015

(54) SEAL STRUCTURE FOR TRANSLATING MEMBER

(75) Inventor: Josh David Fraley, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 319 days.

(21) Appl. No.: 13/406,632

(22) Filed: Feb. 28, 2012

(65) Prior Publication Data

US 2013/0221686 A1 Aug. 29, 2013

(51) Int. Cl.
*E05C 1/02* (2006.01)

(52) U.S. Cl.
USPC .......................................... 292/137; 292/138

(58) Field of Classification Search
CPC ........ B60R 21/38; B60R 21/34; B60R 21/136
See application file for complete search history.

(56) References Cited

U.S. PATENT DOCUMENTS

| 3,031,198 | A | 4/1962 | Hudson |
| 3,216,651 | A | 11/1965 | King et al. |
| 3,285,616 | A | 11/1966 | Doutt |
| 3,829,105 | A | 8/1974 | Kammeraad |
| 5,092,612 | A | 3/1992 | Victor et al. |
| 5,518,256 | A | 5/1996 | Gaffal |
| 6,315,302 | B1 | 11/2001 | Conroy et al. |
| 6,382,634 | B1 | 5/2002 | Dietle et al. |
| 7,753,376 | B2 | 7/2010 | Kondo et al. |
| 7,793,941 | B2 | 9/2010 | Springer et al. |
| 8,292,113 | B2 * | 10/2012 | Nakaya .......................... 220/315 |
| 2011/0127725 | A1 | 6/2011 | Dietle |

* cited by examiner

*Primary Examiner* — Mark Williams
(74) *Attorney, Agent, or Firm* — Christopher G. Darrow; Young Basile Hanlon & MacFarlane P.C.

(57) ABSTRACT

A seal for use with a reciprocating rod in which a small diameter portion and a large diameter portion formed on the rod defining opposed walls. The seal has an inner diameter greater than the small diameter portion of the rod such that the seal is disengaged from the rod during reciprocating movement of the rod; but sealingly engages one of the opposed walls on the rod at first and second end positions of travel of the rod. In a specific implementation, the seal and the reciprocating rod are mounted on a vehicle fuel door housing for sealingly locking the fuel door in a closed position.

11 Claims, 5 Drawing Sheets

SEAL STRUCTURE FOR TRANSLATING MEMBER

BACKGROUND

The present invention relates, in general, to liquid and vapor seals.

Resilient seals are frequently used with translating or rotating parts to prevent liquid and/or vapor leakage around the translating or rotating parts while they are moving or when they are in a static, rest state.

Figure 1:
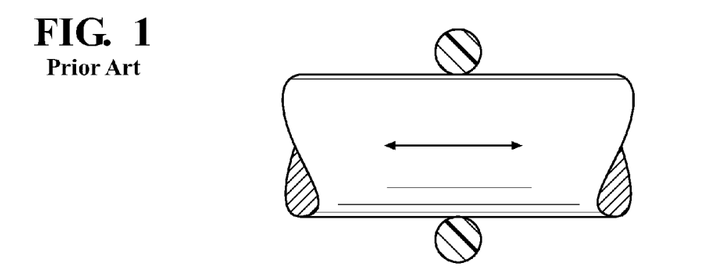
FIG. 1 is a side elevational view of a prior art seal structure for a translating rod.

A typical prior art seal configuration for a moving member, such as a translating or reciprocating rod or shaft, is shown in FIG. 1. In this seal configuration, the inner diameter of the seal is equal to the outer diameter of the shaft so that the seal engages or is disposed in contact with the shaft to prevent the passage of liquid or vapor from one side of the seal to the other side of the seal during movement of the translating rod or when the translating member is in a static state.

Depending upon the material used to form the seal, as well as the cycle frequency of movement of the rod, the seal can be subject to deterioration resulting in eventual breakdown of the seal and loss of contact with the rod thereby allowing undesirable leakage of liquid or vapor from one side of the seal to the other.

It will be desirable to provide a seal configuration which minimizes this problem.

SUMMARY

An apparatus is disclosed for sealing a rod translating between first and second positions. The apparatus includes a small diameter portion and a large diameter portion on a rod defining at least one first or two first and second longitudinally spaced walls extending between the smaller diameter portion of the rod and the larger diameter portion of the rod. A seal is mounted in a fixed position relative to the rod. The seal has an inner diameter greater than the smaller diameter portion of the rod such that the seal is disposed in a non-contacting position relative to the smaller diameter portion of the rod during translation of the rod between the first and second positions. The seal is configured for sealing engagement with one of the first and second walls on the rod when the rod translates to one of the first and second positions.

In one aspect, the seal has a circular cross section sealing engagement portion and the small diameter portion in the rod defines a circular small diameter portion.

In one aspect, the first and second walls on the rod are substantially perpendicular to the longitudinal extent or axis of the rod.

In another aspect, the first and second walls of the rod are disposed at non-perpendicular or obtuse angles relative to the small/diameter portion of the rod.

In a specific implementation, a vehicle fuel door lock apparatus and a seal apparatus are disclosed for positively locking a movable fuel door on fuel door housing in the vehicle. The apparatus includes a movable rod reciprocatingly extending through an aperture in fuel lid housing and adapted for movement between first and second opposed end positions of travel. The rod has an outer diameter along a major extent of the rod. The seal apparatus includes a small diameter portion and a large diameter portion on the rod forming opposed walls between the small diameter portion of the rod and the large diameter portion of the rod.

A seal is fixedly disposed relative to the small diameter portion of the rod. The seal has an inner diameter greater than the small diameter portion of the rod such that the seal is disengaged from the small diameter portion of the rod during translation movements of the rod between the first and second end travel positions, but is positioned to sealingly engage the one of first and second walls at the first and second end positions of travel of the rod.

In one aspect, the seal has a circular cross section sealing engagement portion and the small diameter portion in the rod defines a circular small diameter portion.

In one aspect, the first and second walls on the rod are substantially perpendicular to the small diameter portion of the rod.

In another aspect, the first and second walls on the rod are disposed at non-perpendicular or obtuse angles relative to the small diameter portion of the rod.

In one aspect, a tubular extension extends from the fuel lid housing and defines a through bore opening to an interior of the fuel lid housing. The rod reciprocatingly extending through the bore in the tubular extension and the seal is fixedly coupled to the tubular extension such the inner diameter of the seal is spaced from the small diameter portion of the rod.

In another aspect, a stationary holder fixedly positions the seal adjacent to the aperture in the fuel lid housing to dispose the inner diameter of the seal within the reduced diameter portion of the rod.

BRIEF DESCRIPTION OF THE DRAWING

The various features, advantages and other uses of the present invention will become more apparent by referring to the following detailed description and drawing in which.

DETAILED DESCRIPTION

Figure 2A:
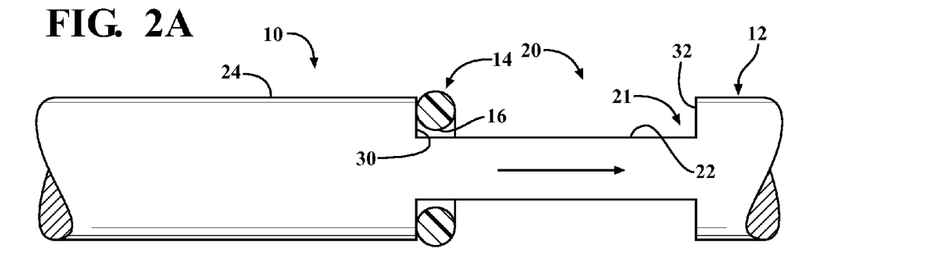
FIGS. 2A, 2B and 2C are side elevational views showing a novel seal structure at various positional states of a translating rod.
Figure 2B:
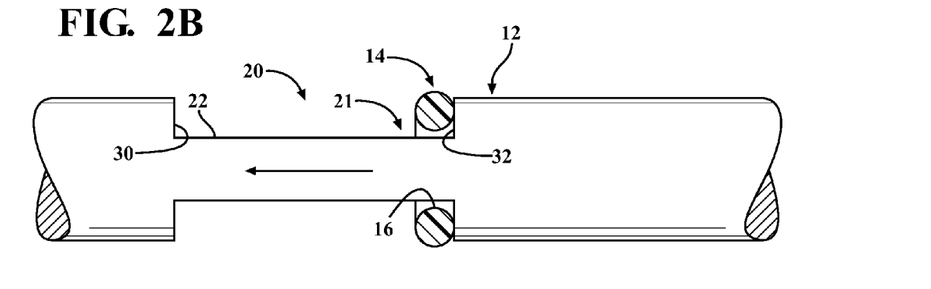
Figure 2C:
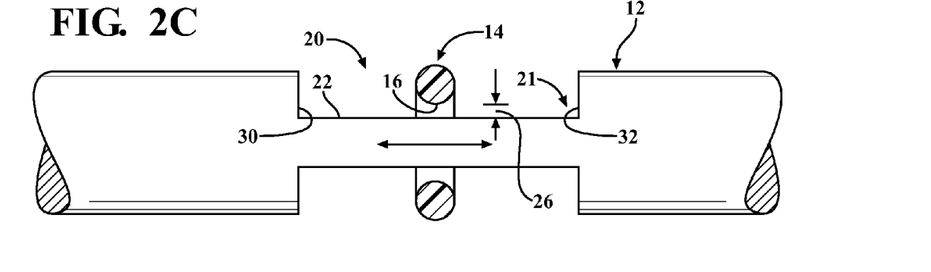

Referring now to the drawing, and to FIGS. 2A, 2B and 2C, in particular, there is depicted a seal structure 10 for use with a translating or reciprocating member 12, shown by way of example only in the form of an elongated rod or shaft, which prevents the passage of liquid or vapor from one side of a stationarily positioned seal 14 to the opposite side of the seal 14.

In the seal structure 10, the rod 12 is connected to a suitable actuator, not shown, which drives the rod in a translating or reciprocating manner to the right to a first end limit of travel as shown in FIG. 2A, or to the left to an opposite second end limit of travel as shown in FIG. 2B. In FIG. 2C, the rod 12 is shown in an intermediary position between the first and second end positions shown in FIGS. 2A and 2B.

The seal 14 is formed of any suitable resilient material, such as rubber, synthetic compositions, etc. It will also be understood that the seal 14 will typically be mounted in a holder or structure surrounding the rod 12.

As shown in FIGS. 2A, 2B and 2C, the seal 14 has an annular shape with a constant diameter circular cross-section, like an O-ring, at least at the end of the seal 14 adjacent to the rod 12. The seal 14 may have other cross-sectional shapes, such as oval, polygonal, irregular, etc. The seal 14 has an inner diameter 16.

As shown in FIGS. 2A, 2B and 2C, seal structure 10 includes a small diameter portion denoted generally by reference number 20 which forms a notch or recess in the lengthwise or longitudinal extent of the rod 12. The small diameter portion 20 is disposed in a notch 21, and has an outer diameter 22 which is less than a major larger outer diameter 24 of the rod 12.

The inner diameter 16 of the seal 14 is greater than the small diameter portion 22 of the notch 21 such that the inner diameter 16 of the seal 14 does not contact the small diameter portion 22 of the notch 21 during translatory movement of the rod 12 to the right as shown in FIG. 2A, or the left as shown in FIG. 2B, as well as at all intermediate portions between the left and right extreme end of travel positional states of the rod 12 as shown in FIG. 2C. This dimensional difference or clearance 26 prevents contact between the inner diameter 16 of the seal 14 and the small diameter portion 22 of the notch 21 in the rod 12.

The small diameter portion 20 has a substantially constant outer diameter 22. Opposite ends 30 and 32 of the notch 20 form walls or shoulders which act as seats for the seal 14 in the extreme first and second end limit of travel positions of the rod 12 shown in FIGS. 2A and 2B.

In the aspect of the seal structure 10 shown in FIGS. 2A, 2B and 2C, the walls 30 and 32 of the notch 20 are disposed at substantially 90° angles with respect to the small diameter portion 22.

It can be seen in FIG. 2A that, when the rod 12 is moved to its extreme right most, first position; a side of the seal 14 sealingly engages the wall 30 to prevent leakage of liquid and/or vapors past the seal 14 from one side of the seal 14 to the other side of the seal 14.

Likewise, as shown in FIG. 2B, when the rod 12 is moved to its extreme left most, second position, the seal 14 sealingly engages the opposite wall 32 of the notch 20.

It will be understood that during all intermediate positions of the seal 14 with respect to the notch 20 during translation of the rod 12 between the extreme left and extreme right positions, the clearance 26 between the inner diameter 16 of the seal 14 and the small diameter portion 22 in the notch 21, as shown in FIG. 2C, will allow a slight amount of liquid and/or vapor to pass from one side of the seal 14 to the other side of the seal 14. However, since the translation of the rod 12 is of short duration between the leftmost and rightmost end limits of movement, such leakage is minimal. More importantly, since the rod 12 will remain in one of the two positions for a considerable period of time, the seal 14 will be in sealing engagement with one of the notch 20 walls 30 or 32 to prevent any liquid or vapor leakage around the seal 14.

Figure 3A:
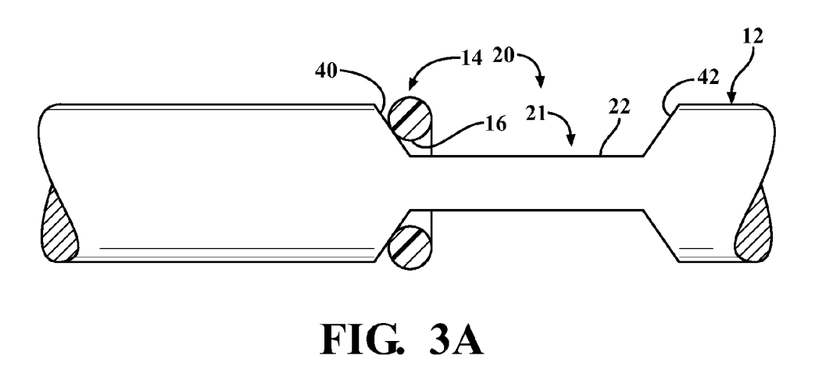
FIGS. 3A, 3B and 3C are side elevational views of an alternate seal structure shown in various positional states of a translating rod.
Figure 3B:
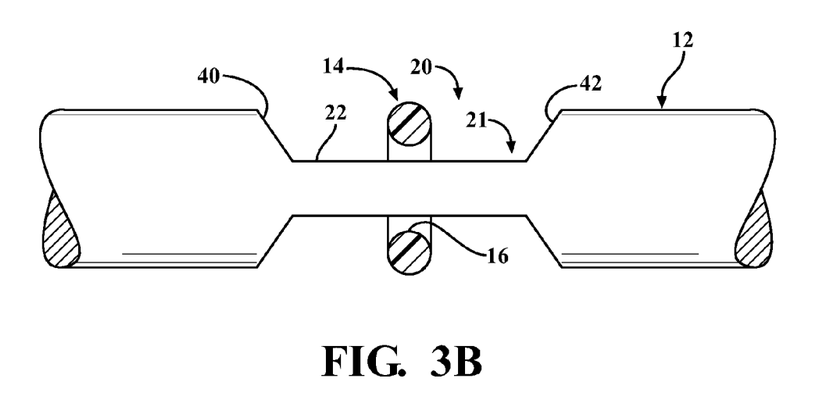
Figure 3C:
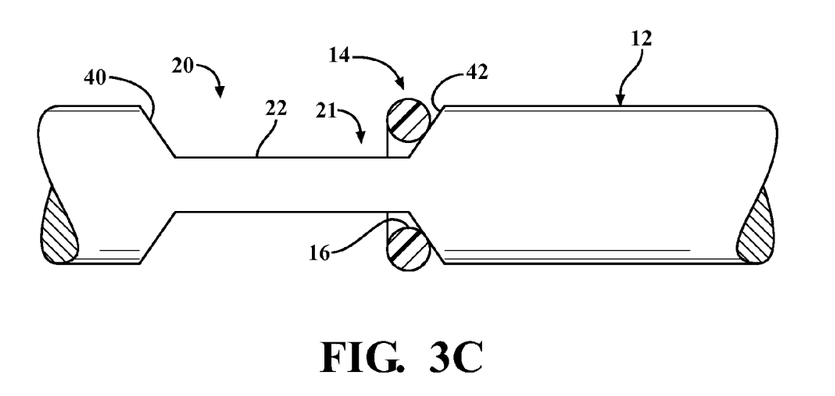

Referring now to FIGS. 3A, 3B and 3C, there is depicted a different structure 10 for the notch 21. In this configuration, the remaining portions of the seal 14 and the rod 12 are identical to like elements described above and shown in FIGS. 2A-2C.

In this alternate configuration of the seal structure 10, the walls 40 and 42 of the notch 21 are disposed at substantially non-perpendicular angles with respect to the linear small diameter 22 of the notch 21. For example, the walls 40 and 42 of the notch 20 are disposed at obtuse angles with respect to the linear small diameter portion 22 of the notch 21. Despite the angular configuration of the walls 40 and 42 of the notch 21, the seal 14 can still sealingly engage either wall 40 or 42 in the leftmost and rightmost end limit of travel of the rod 12 shown in FIGS. 3A and 3C.

Like the previous aspect, the inner diameter 16 of the seal 14, as shown in FIGS. 3A-3C, does not contact the linear small diameter portion 22 of the notch 21 during translation of the rod 12 between the leftmost and rightmost end limits of travel.

Figure 4:
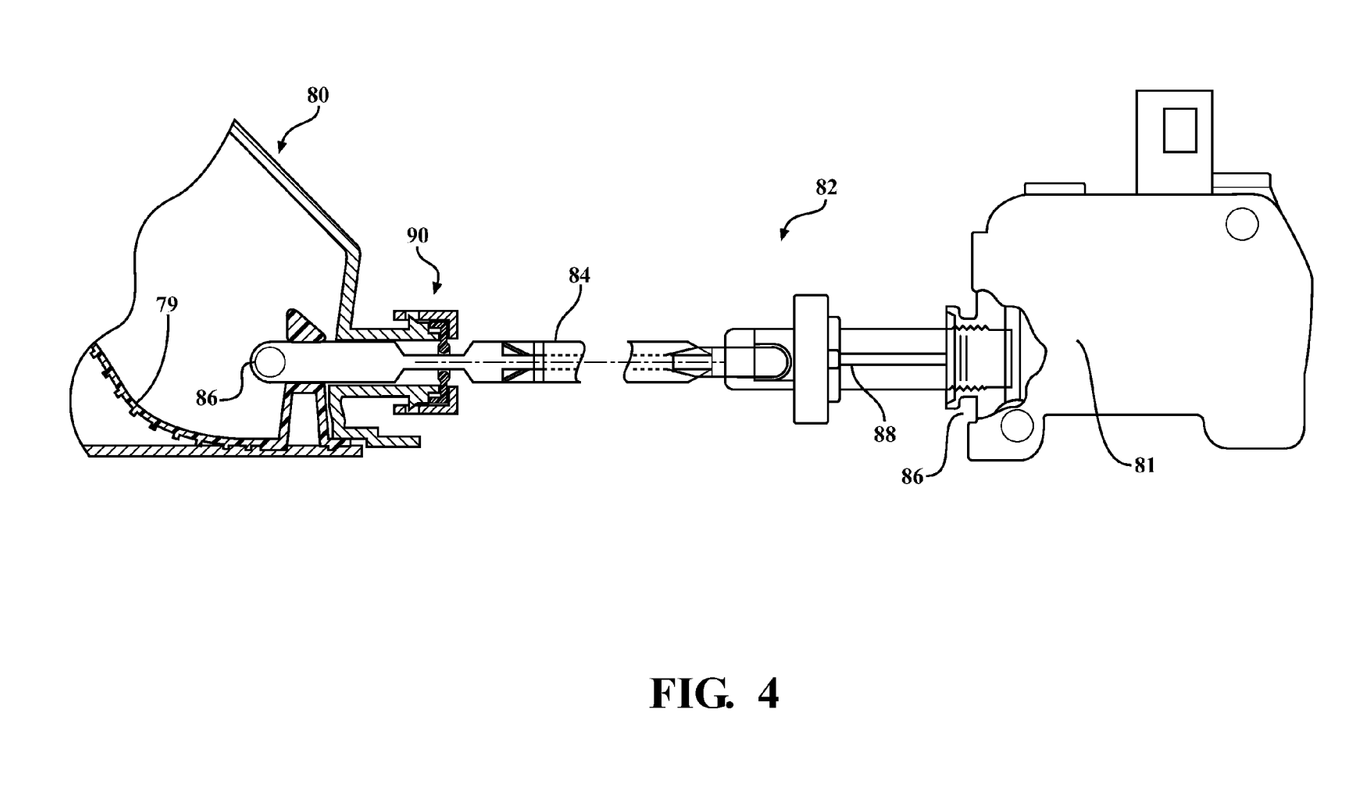
FIG. 4 is a cross sectional view of a specific implementation of the seal structure shown in FIGS. 3A-3C.
Figure 5:
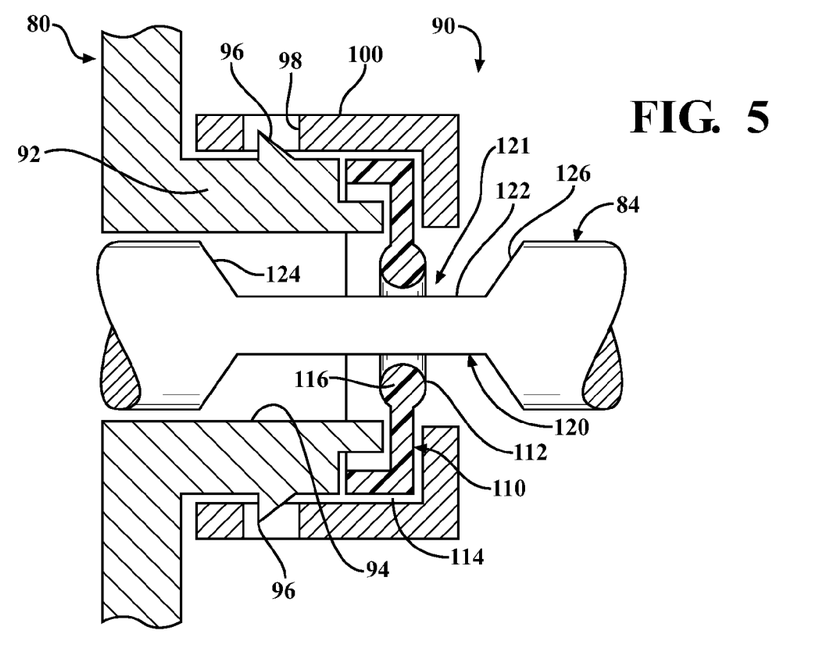
FIG. 5 is an enlarged side elevational of the seal structure shown in FIG. 4.

An implementation of the above-described seal structures is depicted in FIGS. 4 and 5. It will be understood that the following implementation is by way of example only as the present seal structure may be employed in many other different applications.

FIG. 4 depicts a vehicle fuel door lock apparatus which insures that the fuel door 79, when moved by a user to the closed position relative to a fuel door housing 80, is retained in a firmly locked position to prevent the escape of any liquid fuel or fuel vapors from the fuel door housing 80 to the ambient environment.

A lock apparatus 82 includes an elongated rod 84 having a striker 86 formed at one end. The striker 86 is configured for engaging an aperture or suitable structure on the inside of the fuel door 79, to engage and pull the fuel door 79 to a locked position relative to the housing 80. The rod 84 is driven in a translating or reciprocating manner by an actuator 86 in the form of an electric motor 81 having a bi-directional translating output shaft 88 coupled to the rod 84.

A seal structure 90 is mounted on a tubular extension of the fuel door housing 80 to provide sealing between the interior of the fuel door housing 80 and the exterior ambient environment of the fuel door housing 80 due to the passage of the translating rod 84 through a bore in the extension of the fuel door housing 80.

Further details of the seal structure 90 are shown in the enlarged view of FIG. 5. A tubular, outward extending extension denoted generally by reference number 92 is formed on one wall of the fuel door housing 80 and defines an aperture or bore 94 extending through a wall of the fuel lid housing 80. The tubular extension 92 carries one or more catch members 96 which may be in the form of a continuously radially outward extending catch ring, or a series of discontinuously spaced catch members spaced about the circumference of the tubular extension 92.

The catch members 96 engage apertures 98 in a cap 100 to enable to the cap 100 to be mounted over the tubular extension 92 and capture a seal member 110 between the interior of the cap 100 and the end portion of the tubular extension 92. The cap 100 fixedly holds a seal member 100 in place relative to the rod 84.

In this example, the seal member 110 has an annular, circular diameter, ring-like end portion 112 and an integral, angularly formed mounting portion 114 which seats in between adjacent portions of the cap 100 and the end of the tubular extension 92.

As shown in FIG. 5, the annular end portion 112 of the seal 110 is disposed within a small diameter portion 122 in a notch 121 formed in the rod 84. The notch 121 is configured similarly to any of the notches 21 shown in FIG. 2A-2C or 3A-3C, in that the small diameter linear portion 122 of the notch 121 is smaller than the major outer large diameter of the entire rod 84 as well as being smaller than an inner diameter 116 of the annular end portion 112 of the seal member 110. This enables the annular end portion 112 of the seal member 110 to be disengaged from the small diameter portion 122 of the notch 121 during translatory movement of the rod 84 in either direction, but still capable of sealingly engaging either of the end walls 124 and 126 of the notch 121 at the extreme end movement positions of the rod 84.

Figure 6:
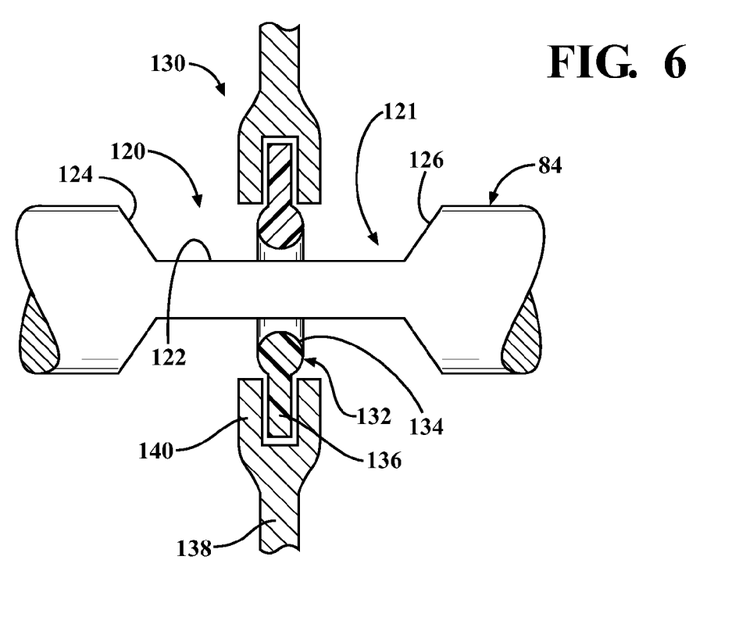
FIG. 6 is an enlarged side elevational of an alternate seal structure usable in the specific application depicted in FIG. 4.

An alternate seal structure 130 is shown in FIG. 6. In this aspect, the rod 84 and the recess 20 are identical to the corresponding components shown in FIG. 5. A seal member 132, having a circular cross section end portion 134 and a generally linear, integral, mounting portion 136 extending therefrom, has an inner diameter greater than a small diameter portion 122 of the notch 121 in the rod 84 so as to be spaced from the linear portion of the rod 84 during translation of the rod 84 in either direction, but still positioned to sealingly engage either wall 124 or 126 of the notch 121 at the extreme end positions of movement of the rod 84.

In this aspect, the fuel door housing 80 does not include a tubular extension 92. Rather, a holder 138 mounted to suitable stationary structure surrounding the fuel door housing 80 or connected to the fuel door housing 80 itself, has an end portion 140 complimentary to the shape of the mounting portion 136 of the seal member 132 to fixedly receive and hold the seal member 132 in the desired position relative to the notch 120 in the rod 84.

In fueling operations, the fuel door, not shown, is opened and closed manually by a user, but is connected to a push-push rod, also not shown, such that a slight tap on a closed fuel door releases the fuel door a small fuel amount from the fuel lid or surrounding edges of the fuel lid housing. The user can then grasp the edge of the fuel lid or door to fully open the door for fueling operations. At the completion of fueling operations, the user firmly closes the door in the fuel lid housing opening.

A signal is provided to the fuel rod actuator or motor 81, shown in FIG. 4, to extend or retract the rod 84. By way of example only, a signal from the vehicle body ECU is provided to the fuel rod motor 81 to extend the rod 84 to engage the fuel lid door and to hold the fuel lid door in a locked position or disengages the end of the rod 84 from the fuel lid door striker. This signal can be generated every time the vehicle doors are locked and unlocked, for example.

At the completion of fueling operations, the user manually closes the fuel door to engage the push-push rod. At the very next time the vehicle doors are locked, such as after the driver re-enters the vehicle, closes the door and starts the vehicle ignition, the vehicle body ECU sends a signal to the fuel rod motor 81 causing the rod 84 to extend and engage the striker to hold the fuel door 79 in the fully locked position.

Figures 7A, 7B, 7C:
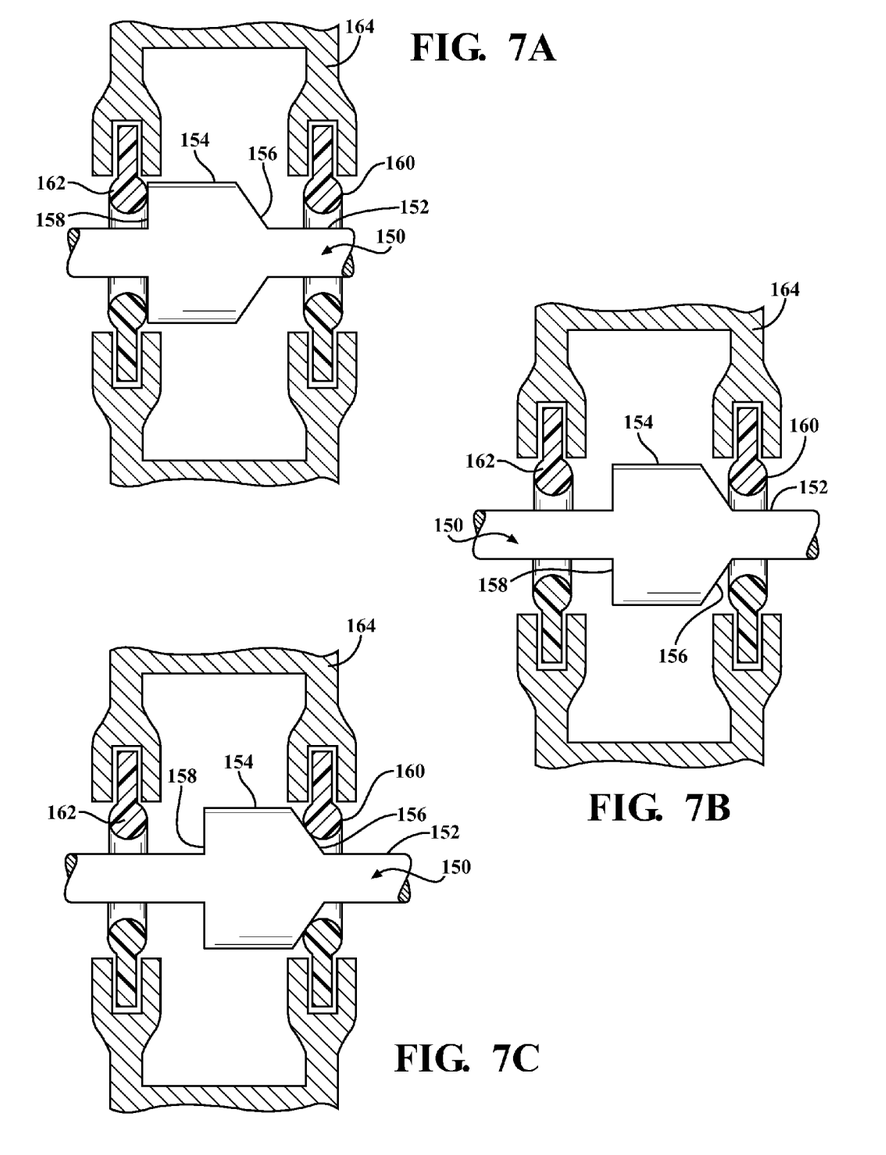
FIGS. 7A, 7B, and 7C are side elevational view showing another aspect of a seal structure at various positional states of a translating rod.

Referring now to FIGS. 7A, 7B and 7C, there is depicted another aspect of a seal structure. In this aspect, a rod 150 has a first small diameter portion 152 extending along a major longitudinal extent thereof. An enlarged area is formed on the rod 150 and creates a large diameter portion 154. Walls 156 and 158 are formed at the junctures between the small diameter portion 150 and each end of the large diameter portion 154. As in previous aspects of the present seal structure, the walls 156 and 158 may be disposed at a substantially perpendicular angle relative to the small diameter portion 152 or at a non-perpendicular angle, such as an obtuse angle, as shown in FIG. 7A. The angles of the walls 156 and 158 may be the same or different, as shown by example only in FIG. 7A.

In this aspect, two separate seals 160 and 162 or a single unitary seal with two separate seal lobes 160 and 162, are mounted in the suitable holder 164 such that the end portions or lobes 160, 162 of a single seal member are held in the fixed position relative to the translating rod 150, but are spaced from the smaller diameter portion 152 on the rod 150 during all translational movements of the rod 150 as shown in FIG. 7B which represents an intermediate travel position of the rod 150.

In FIG. 7A, the rod 150 has translated to its extreme first left most end position of travel. In this position, the seal 162 sealingly engages the wall 158 on the rod 150.

As the rod translates from the leftmost or second end travel position shown in FIG. 7A through the intermediate positions depicted in FIG. 7B, the rod 150 eventually reaches its right most or second end travel position shown in FIG. 7C. In this position, the seal 160 sealingly engages the wall 156 on the rod 150.

What is claimed is:

1. An apparatus comprising:
    a vehicle fuel door housing mounted on a vehicle;
    a vehicle fuel door movably coupled to the fuel door housing;
    a rod reciprocatingly extending through an aperture in a fuel door housing and adapted for movement between first and second opposed end positions of travel to engage with and disengage from the vehicle fuel door;
    the rod having a smaller diameter portion and a co-linear larger diameter portion;
    the rod including a wall extending angularly with respect to a longitudinal axis of the rod between the smaller and larger diameter portions of the rod;
    a seal mounted in a fixed position on the housing relative to the rod, the seal having an inner diameter greater than the smaller diameter portion of the rod such that the seal is disposed in a non-contacting position relative to the smaller diameter portion of the rod during translation of the rod between the first and second positions; and
    the seal disposed for sealing engagement with the wall when the rod translates to one of the first and second positions.

2. The apparatus of claim 1 wherein:
    the seal has a circular cross section sealing engagement portion; and
    the small diameter portion on the rod defines a circular small diameter portion.

3. The combination of claim 2 wherein:
    the wall on the rod extends substantially perpendicular to a longitudinal axis of the rod.

4. The apparatus of claim 3 wherein:
    the wall on the rod extends at a non-perpendicular angle relative to the longitudinal axis of the rod.

5. The apparatus of claim 4 wherein:
    the wall on the rod extends at an obtuse angle relative to the inner portion of the reduced diameter portion of the rod.

6. The apparatus of claim 5 further comprising:
    a tubular extension extending from the fuel door housing defining a through bore opening to an interior of the fuel door housing;
    the rod reciprocatingly extending through the bore in the tubular extension; and
    the seal fixedly coupled to the tubular extension such the inner diameter of the seal is disposed within the reduced diameter portion of the rod.

7. The apparatus of claim 6 further comprising:
    a stationary holder fixedly positioning the seal adjacent to the aperture in the fuel door housing to dispose the inner diameter of the seal within the reduced diameter portion of the rod.

8. The apparatus of claim 2 wherein:
    the small diameter portion of the rod defines the major longitudinal diameter of the rod.

9. The apparatus of claim 1 wherein:
    the seal is a single seal;
    the small diameter portion on the rod is disposed between two walls carried on the rod; and the seal engages one wall in the first position of travel in the rod and the other wall in the second position of travel of the rod.

10. The combination claim 9 wherein:

the small diameter portion on the rod is disposed in a reduced diameter recess in the rod; and the large diameter portion of the rod defines a major outer diameter of a longitudinal extent of the rod, wherein the seal has first and second spaced seal portions, each separately engagable with one of the walls on the rod.

11. The combination of claim 10 wherein:

the two walls extend radially outward on the rod from the small diameter portion of the rod;

a large diameter portion of the rod is disposed between the two walls and is spaced radially outwardly from the small diameter portion of the rod;

the first seal portion fixedly disposed with respect to one of the two walls to sealingly engage the one wall when the rod is in the first end of travel position; and the second seal portion fixedly disposed with respect to the rod to sealingly engage the other wall when the rod in the second end of travel position.

\* \* \* \* \*

UNITED STATES PATENT AND TRADEMARK OFFICE
CERTIFICATE OF CORRECTION

| | | |
|---|---|---|
| PATENT NO. | : 8,960,732 B2 | Page 1 of 2 |
| APPLICATION NO. | : 13/406632 | |
| DATED | : February 24, 2015 | |
| INVENTOR(S) | : Josh David Fraley | |

It is certified that error appears in the above-identified patent and that said Letters Patent is hereby corrected as shown below:

In the Drawings:

Sheet 3, Fig. 4, please replace the reference numeral "86" on the right side of Fig. 4 with --87--.

In the Specification:

Column 1, line 58, please replace "lid" with --door--.
Column 2, line 17, please replace "lid" with --door--.
Column 2, line 23, please replace "lid" with --door--.
Column 3, line 33, please replace "notch 20" with --notch 21--.
Column 3, line 37, please replace "right" with --left--.
Column 3, line 42, please replace "left" with --right--.
Column 3, line 56, please replace "notch 20" with --notch 21--.
Column 3, line 67, please replace "notch 20" with --notch 21--.
Column 4, line 27, please replace "actuator 86" with --actuator 87--.
Column 4, line 46, please replace "aperatures 98" with --aperatures 94--.
Column 4, line 50, please replace "seal member 100" with --seal member 110--.
Column 5, line 5, please replace "recess 20" with --notch 21--.

In the Claims:

Column 6, line 22, after "and", please add --the--.
Column 6, line 38, please replace "combination" with --apparatus--.
Column 6, line 38, after "relative to", please replace "the" with --an--.
Column 6, line 39, please replace "reduced" with --smaller--.
Column 6, line 45, replace "the inner portion" with --an inner portion--.
Column 6, line 46, replace "reduced" with --smaller--.
Column 6, line 54, please replace "reduced" with --smaller--.
Column 6, line 59, please replace "reduced" with --smaller--.

Signed and Sealed this
Twenty-fourth Day of May, 2016

Michelle K. Lee
*Director of the United States Patent and Trademark Office*

CERTIFICATE OF CORRECTION (continued)
U.S. Pat. No. 8,960,732 B2

Column 7, line 3, please replace "combination" with --apparatus--.
Column 7, line 11, please replace "combination" with --apparatus--.
Column 7, line 14, before "large diameter portion", please replace "a" with --the--.